Aug. 18, 1942.   J. F. SLADKY   2,293,313
BEARING
Filed April 6, 1940
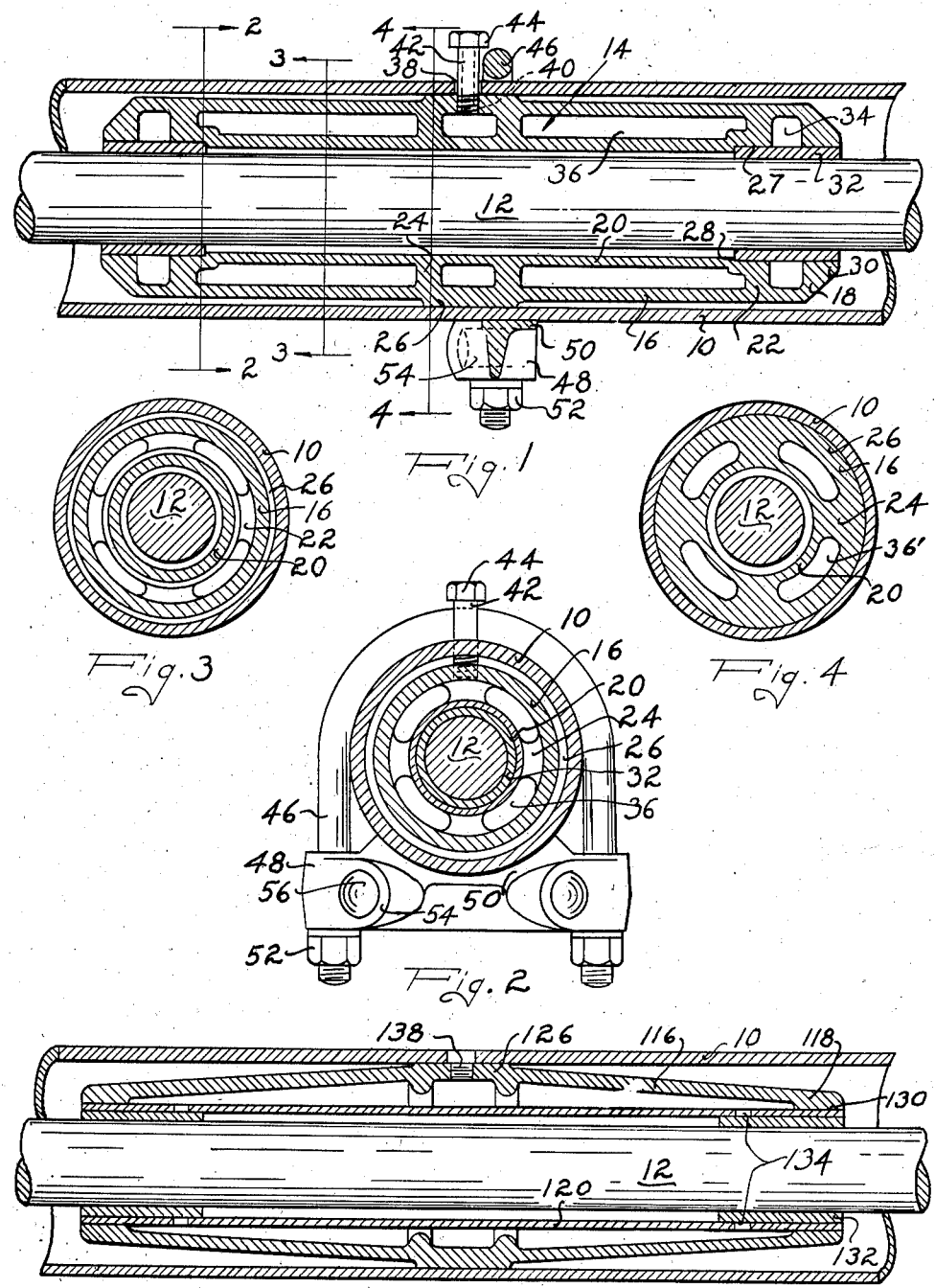
INVENTOR.
JOSEPH F. SLADKY.
BY Carl J. Barbee
ATTORNEY.

Patented Aug. 18, 1942

2,293,313

UNITED STATES PATENT OFFICE 2,293,313

BEARING

Joseph F. Sladky, Racine, Wis., assignor to Nash-Kelvinator Corporation, Kenosha, Wis., a corporation of Maryland Application April 6, 1940, Serial No. 328,198

16 Claims. (Cl. 308—65)

This invention relates to bearings and has particular reference to a bearing for journaling the mid-section of a shaft within a tube or housing.

An unsupported, rotating shaft has certain speeds known as critical speeds at which it will vibrate out its normal straight line position. The critical speed may be raised beyond the speeds at which the shaft will be operated by increasing the cross sectional area of the shaft or by decreasing the unsupported length of the shaft by the use of more or longer bearings. This invention provides novel means for decreasing the unsupported length of the shaft so that a shaft of smaller cross section may be used.

It is an object of this invention to provide a novel bearing which will increase the supported length of the shaft.

It is another object of this invention to provide a bearing which is more easily installed than those used heretofore.

It is another object of this invention to provide a bearing which may be removed from its tube for repair.

It is another object of this invention to provide a novel means for lubricating a bearing within a tube.

It is another object of this invention to provide a clamp for retaining a bearing in a tube, which clamp also operates to brace the tube.

Other objects and advantages of this invention will be apparent from a consideration of the following description and attached drawing of which there is one sheet and in which Figure 1 represents a longitudinal section through a drive shaft tube, shaft and bearing constructed according to my invention;

Figure 2 represents a vertical section taken along the line 2—2 of Figure 1 and looking in the direction of the arrows;

Figure 3 represents a vertical section taken along the line 3—3 of Figure 1 and looking in the direction of the arrows;

Figure 4 represents a vertical section taken along the line 4—4 of Figure 1 and looking in the direction of the arrows;

Figure 5 represents a section similar to Figure 1 and shows a modified type of bearing embodying my invention.

My bearing is particularly useful in automotive vehicles in which the drive shaft is carried down a hollow tube, which tube is connected to transmit part or all of the driving force from the wheels to the frame and body. Such an automotive drive is disclosed in the copending application of Nils Erik Wahlberg, Serial No. 271,464, filed May 3, 1939, for a Motor mount. My bearing may, however, be used in other devices where a shaft is carried within a hollow tube, and I do not intend to limit this application to the particular use disclosed.

In the past it has been the practice to install bearings of this general nature by press fitting them within the tube. If the bearing was too long, it was hard to press it into the tube; if it was short, the unsupported length of the shaft was increased. In any case, the bearing once installed was practically impossible to remove without equipment usually kept only at the factory which made the unit.

I have shown a drive shaft tube 10 within which is located the drive shaft 12. My bearing, generally indicated at 14, is installed preferably near the mid-point of the unsupported length of the drive shaft.

My bearing is preferably made in the form of a casting having an outer cylinder 16 closed by the end walls 18 which are apertured to pass the shaft 12. Within the outer cylinder 16 is a shorter inner cylinder 20 supported from the outer cylinder in spaced co-axial relationship by end struts 22 and center struts 24 extending radially between the two cylinders. Formed around the center of the outer cylinder is a raised annular ring 26.

The annular ring 26 has an outside diameter slightly smaller than the inside diameter of the tube 10 so that the casting 14 may be easily installed in and removed from the tube 10. The remainder of the cylinder 16 is small enough so that with ordinary casting limits, it will pass the tube 10. This makes it unnecessary to machine the whole length of the cylinder. The inner cylinder 20 has an inside diameter slightly larger than the diameter of the shaft 12.

The inside surface of the ends of the inner cylinder 20 are cut away to slightly larger diameter than the rest of the cylinder at 27 forming the shoulder 28, and the aperture in the end walls 18 of the outer cylinder 16 is cut to the same diameter as the cut-away portion 27. It will be noted that the end wall 18 of the outer cylinder 16 is thickened around the aperture as indicated at 30. A sleeve 32 of porous bearing material such as pressed ground bronze is fitted within the surface 30 of the end walls 18 of the outer cylinder 16 and the cut-away portion 27 of the inner cylinder 20. The sleeve abuts against the shoulder 28 and bridges the space between the ends of the inner cylinder 20 and the outer cylinder 16 forming a hollow annular space 34 at each end of the casting, which space connects with the annular space 36 between the two cylinders 16 and 20 through the openings 36' between the end struts 22. The inside surfaces of the sleeves 32 form the actual bearing surfaces for the shaft 12.

The top of the tube 10 is apertured at 38 where it is desired to locate the casting, and the outer cylinder 16 is provided with a tapped hole 40 which is aligned with the aperture 38 when the casting is in proper position. A hollow pipe 42 is passed through the hole 38 in the drive shaft tube 10 and threaded into the hole 40 in the casting 14. The pipe serves to retain the casting 14 in position and allows oil to be fed into the annular space 36. The hollow pipe is closed by a cap nut 44.

To more securely fasten the bearing casting 14 within the tube 10, I have provided the U-bolt 46 which fits around the tube 10 and has its threaded ends passed through a clamp 48. The clamp 48 is provided with a saddle portion 50 which is drawn up tight against the tube 10 by the nuts 52 on the threaded ends of the U-bolt 46. By drawing the U-bolt up tight the tube 10 may be deformed sufficiently to clamp it tightly to the raised ring 26 around the center of the bearing casting 14. This prevents the bearing from moving, but the clamp may be removed to take out the bearing for repair.

The clamp 48 is provided with two bosses 54 which diverge outwardly from the rear of the clamp. Each boss 54 is drilled and tapped as at 56 to receive the threaded ends of brace rods (not shown) which may extend to the ends of the rear axle to form an A-brace between the drive shaft tube and the rear axle. The clamp 48 thus serves the double purpose of retaining the casting 14 in place and connecting the brace rods to the drive shaft tube 10 at the point where the tube is reinforced against collapsing by the casting 14.

In the modified form of my invention illustrated in Figure 5, the outer cylinder 116, which is conveniently made by casting, is tapered from the center annular ring 126 to the ends 118 which are thickened and machined in co-axial holes as at 130. The inner cylinder 120 is not cast along with the outer cylinder 116 but is a tubular metal sleeve pressed into the end portions 130 of the outer casting. Short cylinders 132 of porous bearing material are pressed into each end of the cylinder 120 and form the actual bearing surface for the shaft 12 which turns within the drive shaft tube 10. The outer cylinder 116 and the tube 10 are apertured at 138 so that a hollow pipe may be inserted into the space between the inner and outer cylinders 120 and 116 in the same manner as is illustrated and described in connection with Figures 1 and 2. My modified bearing is arranged to be retained in place by the same type of U-bolt and clamp shown in Figures 1 and 2.

It will be noted that the inner cylinder 120 (Figure 5) is apertured as at 134 at spaced intervals around its circumference and near its ends. The apertures 134 are covered on the inside of the inner cylinder 120 by the porous bearings 132. Oil is permitted to seep from the reservoir between the cylinders 116 and 120, through the apertures 134 and porous bearing 132 to lubricate the shaft and bearing.

What I claim is:

1. In combination with a drive shaft tube and a drive shaft positioned therein, a pair of axially spaced bearing surfaces arranged to support said drive shaft, a cylindrical member for aligning said bearing surfaces, and means on said tube for contracting said tube to support said cylindrical member.

2. In combination with a drive shaft tube having a drive shaft therein, a plurality of spaced bearing surfaces, a one piece cylindrical member for holding said bearing surfaces in axial alignment, clamping means for securing said cylindrical member in said tube, and a lubricant reservoir in said cylindrical member.

3. In combination with a drive shaft tube in which a drive shaft is arranged to rotate, a cylindrical bearing positioned within said tube and around said drive shaft, said bearing contacting said tube along a cylindrical surface near the center of said bearing and contacting said shaft at points spaced on each side of the area of contact of said tube, and means for retaining said bearing in position relative to said tube.

4. In combination with a drive shaft tube and a shaft arranged to rotate within said tube, a cylindrical bearing positioned within said tube and around said drive shaft, said bearing having a portion arranged to engage the inside of said tube, and relieved portions on each side of said engaging portion arranged to clear the inside of said tube, and anti-friction means located at the ends of said relieved portions for contacting said shaft.

5. In combination with a drive shaft tube and a drive shaft arranged to rotate within said tube, a bearing having a central cylindrical portion arranged to contact the inside of said tube, tapered cylindrical portions extending from each side of said central cylindrical portion and diminishing in cross section, and anti-friction means positioned at the ends of said tapered cylindrical portions for journaling said shaft, the walls of said bearing between said anti-friction means being spaced from said shaft.

6. A bearing for a shaft arranged to rotate within a tube, said bearing comprising a hollow member having a cylindrical portion of slightly less diameter than the inside of said tube, and cylindrical end portions of considerably less diameter than the inside of said tube, and clamping means for drawing said tube into contact with the first mentioned cylindrical portion of said hollow member.

7. In an automobile having a drive shaft tube with a drive shaft positioned therein, a hollow member positioned within said tube, clamp means drawing the walls of said tube into tight contact with said hollow member, anti-friction means carried by said hollow member in contact with said shaft and spaced longitudinally along said shaft from said clamping means, and means formed on said clamping means for connecting brace rods to said tube.

8. In an automobile a drive shaft tube defining an aperture in its top portion and midway of its length, a hollow cylinder of smaller diameter than the inside of said tube positioned within said tube, a central cylindrical portion of increased diameter formed on said hollow cylinder to contact the inside of said tube and defining an aperture aligned with the aperture in said tube, and interlocking means positioned in said apertures and engageable with said tube and said hollow cylinder.

9. In an automobile a drive shaft tube defining an aperture in its top portion and midway of its length, a cylindrical bearing retainer of smaller diameter than the inside of said tube positioned within said tube, a central portion of increased diameter formed on said bearing retainer contacting the inside surface of said tube and defining an aperture aligned with the aperture in said tube, and interlocking means positioned in said apertures and engageable with said tube and said bearing retainer, said interlocking means permitting the addition of lubricant into said bearing retainer.

10. In an automobile having a drive shaft tube with a drive shaft positioned therein, a cylindrical bearing member positioned in said tube, said bearing member having a cylindrical contacting surface with the inside of said tube for only a fraction of the length of said cylindrical member, clamping means positioned around said tube where said tube contacts said cylindrical member, an interlocking member passing through said tube to said cylindrical member, and means for attaching brace rods to said clamping means.

11. In an automobile having a drive shaft tube with a drive shaft positioned therein, a cylindrical bearing retainer positioned in said tube, said bearing retainer contacting the inside of said tube along a cylindrical surface for only a fraction of the length of said retainer, clamping means positioned around said tube where said tube contacts said cylindrical bearing retainer, an interlocking member passing through said tube to said cylindrical bearing retainer, and means for attaching brace rods to said clamping means, said interlocking means defining an aperture for the addition of lubricant into said bearing retainer.

12. In combination with an automobile having a drive shaft tube and a drive shaft located therein, a bearing between said tube and said shaft comprising a casting having an outer cylindrical wall contacting the inside of said tube and an inner cylindrical wall spaced from said outer wall by a series of struts cast integrally with said walls, and anti-friction sleeves positioned at each end of said casting, a portion of the outer surface of said anti-friction means being open to the space between said cylindrical walls.

13. A bearing arranged to support a shaft within a tube comprising a casting having an outside cylindrical wall and end walls defining aligned apertures, an inner cylindrical wall spaced from said outer wall and connected to said outer wall by struts at the ends of said inner wall, sleeves of porous anti-friction material positioned between the ends of said inner wall and the apertures in the end walls of said outer cylindrical wall and communicating with the space between said two cylindrical walls, and means for supplying lubricant to the space between said cylindrical walls.

14. A bearing designed to support a shaft within a tube comprising a hollow cylindrical member having end walls defining apertures, a second cylindrical member of smaller diameter than said first cylindrical member fitted within the apertures in said first cylindrical member, said second cylindrical member defining holes through its walls near the ends thereof and communicating with the space between said cylindrical members, and sleeves of porous anti-friction material positioned in each end of said second cylindrical member, said sleeves covering the apertures in said second cylindrical member.

15. A bearing designed to support a shaft within a tube comprising a hollow cylindrical member having end walls defining apertures, a second cylindrical member of smaller diameter than said first cylindrical member fitted within the apertures in said first cylindrical member, said second cylindrical member defining holes through its walls near the ends thereof and communicating with the space between said cylindrical members, and sleeves of porous anti-friction material positioned in each end of said second cylindrical member, said sleeves covering the apertures in said second cylindrical member, and means for supplying lubricant to the space between said cylindrical members.

16. A bearing for supporting a shaft within a tube comprising an outer cylindrical portion having end walls, an inner cylindrical portion having end walls connecting said inner cylinder with said outer cylinder and defining apertures, said inner and outer end walls defining annular spaces, and sleeves of porous anti-friction material supported by the end walls of said cylinders and bridging said annular spaces.

JOSEPH F. SLADKY.